United States Patent
Munakata et al.

(10) Patent No.: US 12,458,658 B2
(45) Date of Patent: Nov. 4, 2025

(54) COMPOSITION FOR INHIBITING REPLICATION OF HEPATITIS B VIRUS

(71) Applicant: Tokyo Metropolitan Institute of Medical Science, Tokyo (JP)

(72) Inventors: Tsubasa Munakata, Tokyo (JP); Michinori Kohara, Tokyo (JP); Takahiro Sanada, Tokyo (JP)

(73) Assignee: Tokyo Metropolitan Institute of Medical Science

( * ) Notice: Subject to any disclaimer, the term of this patent is extended or adjusted under 35 U.S.C. 154(b) by 764 days.

(21) Appl. No.: 17/294,171

(22) PCT Filed: Nov. 16, 2019

(86) PCT No.: PCT/JP2019/044748
§ 371 (c)(1),
(2) Date: May 14, 2021

(87) PCT Pub. No.: WO2020/100994
PCT Pub. Date: May 22, 2020

(65) Prior Publication Data
US 2022/0016155 A1    Jan. 20, 2022

(30) Foreign Application Priority Data
Nov. 16, 2018  (JP) ................... 2018-215898

(51) Int. Cl.
*A61K 31/713*  (2006.01)
*A61P 31/20*   (2006.01)
*C12N 15/113*  (2010.01)

(52) U.S. Cl.
CPC .......... *A61K 31/713* (2013.01); *A61P 31/20* (2018.01); *C12N 15/113* (2013.01)

(58) Field of Classification Search
CPC ..... A61K 31/713; A61P 31/20; C12N 15/113; A01K 2227/105; A01K 2267/0337
See application file for complete search history.

(56) References Cited

FOREIGN PATENT DOCUMENTS

| CN | 108676883 A | 10/2018 | | |
|----|----|----|----|----|
| JP | 2013-537412 A | 10/2013 | | |
| JP | 2013-537423 A | 10/2013 | | |
| WO | WO 2012024170 | 2/2012 | | |
| WO | WO-2012024170 A2 * | 2/2012 | ............ | A61K 31/713 |
| WO | WO 2013109604 A1 | 7/2013 | | |
| WO | WO 2015/037656 | 3/2015 | | |
| WO | WO 2017190197 | 11/2017 | | |
| WO | WO-2017190197 A1 * | 11/2017 | ............ | A61K 31/513 |
| WO | WO 2017205078 | 11/2017 | | |

OTHER PUBLICATIONS

Yang X, Li H, Sun H, Fan H, Hu Y, Liu M, Li X, Tang H. Hepatitis B Virus-Encoded MicroRNA Controls Viral Replication. J Virol. Apr. 28, 2017;91(10):e01919-16. doi: 10.1128/JVI.01919-16. PMID: 28148795; PMCID: PMC5411615. (Year: 2017).*

Bak RO, Hollensen AK, Primo MN, Sørensen CD, Mikkelsen JG. Potent microRNA suppression by RNA Pol II-transcribed 'Tough Decoy' inhibitors. RNA. Feb. 2013;19(2):280-93. doi: 10.1261/rna. 034850.112. Epub Dec. 18, 2012. PMID: 23249752; PMCID: PMC3543086. (Year: 2013).*

Li Tang et al, microRNA inhibitors: Natural and artificial sequestration of microRNA, Cancer Letters, vol. 407, 2017, pp. 139-147, ISSN 0304-3835, https://doi.org/10.1016/j.canlet.2017.05.025. (Year: 2017).*

Ha M, Pang M, Agarwal V, Chen ZJ. Interspecies regulation of microRNAs and their targets. Biochim Biophys Acta. Nov. 2008; 1779(11):735-42.doi: 10.1016/j.bbagrm.2008.03.004. EpubMar. 25, 2008.PMID: 18407843;PMCID:PMC2586835. (Year: 2008).*

Banzhaf-Strathmann, J., Edbauer, D.Good guy or bad guy:the opposing roles of microRNA125b in cancer.Cell Commun Signal 12,30(2014).https://doi.org/10.1186/1478-811X-12-30(Year:2014) (Year: 2014).*

Chakraborty D, Ghosh S. The epsilon motif of hepatitis B virus RNA exhibits a potassium-dependent ribonucleolytic activity. FEBS J. Apr. 2017;284(8):1184-1203. doi: 10.1111/febs.14050. Epub Mar. 17, 2017. PMID: 28236666. (Year: 2017).*

Meike H. van der Ree et al, , Long-term safety and efficacy of microRNA-targeted therapy in chronic hepatitis C patients, Antiviral Research, vol. 111, 2014, pp. 53-59, ISSN 0166-3542, https://doi.org/10.1016/j.antiviral.2014.08.015. (Year: 2014).*

Mizuguchi Y, Takizawa T, Uchida E. Host cellular microRNA involvement in the control of hepatitis B virus gene expression and replication. World J Hepatol 2015; 7(4): 696-702 (Year: 2015).*

Desvignes T et al. miRNA Nomenclature: A View Incorporating Genetic Origins, Biosynthetic Pathways, and Sequence Variants. Trends Genet. Nov. 2015;31(11):613-626. doi: 10.1016/j.tig.2015. 09.002. Epub Oct. 8, 2015. PMID: 2645349 (Year: 2015).*

Zhang X, Zhang E, Ma Z, Pei R, Jiang M, Schlaak JF, Roggendorf M, Lu M. Modulation of hepatitis B virus replication and hepatocyte differentiation by MicroRNA-1. Hepatology. May 2011;53(5):1476-85. doi: 10.1002/hep.24195. PMID: 21520166. (Year: 2011).*

Guang-ling Zhang, Yi-xuan Li, Shu-qi Zheng, Min Liu, Xin Li, Hua Tang, Suppression of hepatitis B virus replication by microRNA-199a-3p and microRNA-210, Antiviral Research, vol. 88, Issue 2, (Year: 2010).*

Homo sapiens uncharacterized protein DKFZP434I0714 (DKFZP434I0714), long non-coding RNA (Year: 2016).*

(Continued)

*Primary Examiner* — Brian Whiteman
*Assistant Examiner* — Amanda M Zahorik
(74) *Attorney, Agent, or Firm* — Fish & Richardson P.C.

(57) ABSTRACT

The present invention provides a pharmaceutical composition for treating hepatitis B. The present invention provides a composition for inhibiting the replication of hepatitis B virus and a pharmaceutical composition for treating hepatitis B virus infection, each comprising an inhibitory substance against microRNA binding to the 5' epsilon signal sequence in the pregenomic RNA of hepatitis B virus.

1 Claim, 13 Drawing Sheets

Specification includes a Sequence Listing.

(56) References Cited

OTHER PUBLICATIONS

NCBI Reference Sequence NR_039658.1. *Homo sapiens* microRNA 4453. Pub Jun. 24, 2011. (Year: 2011).*
Lennox & Behlke. "Chemical modification and design of anti-miRNA oligonucleotides". Gene Ther 18, 1111-1120 (2011). (Year: 2011).*
Bell. "Detection of a MicroRNA molecular signature of ultraviolet radiation in the superficial regions of melanocytic nevi on sun-exposed skin". Modern Pathology. vol. 31, Issue 11, Jan. 2018, pp. 1744-1755. (Year: 2018).*
CN Office Action in Chinese Appln. No. 201980075215.0, mailed on Aug. 9, 2023, 13 pages (with English translation).
JP Office Action in Japanese Appln. No. 2020-556176, mailed on Oct. 10, 2023, 6 pages (with English translation).
EP Office Action in European Appln. No. 19883848.4, dated May 30, 2023, 5 pages.
JP Japanese Office Action in Japanese Appln. No. 2020-556176, dated Jun. 6, 2023, 8 pages (with English translation).
EP Search Report in European Appln. No. 19883848.4, dated Jul. 21, 2022, 8 pages.
CN Office Action in Chinese Appln. No. 201980075215.0, mailed on May 25, 2024, 11 pages (with English translation).
Jopling et al., "Modulation of Hepatitis C Virus RNA Abundance by a Liver-Specific MicroRNA," Science, Sep. 2005, 309(5740):1577-1581.
PCT International Search Report and Written Opinion in International Appln. No. PCT/JP2019/044748, dated Jan. 17, 2020, 10 pages (with English Translation).
Pedersen et al., "Interferon modulation of cellular microRNAs as an antiviral mechanism," Nature, Oct. 2007, 449(7164):919-922.
Zhang et al., "Suppression of hepatitis B virus replication by microRNA-199a-3p and microRNA-210," Antiviral Research, 2010, 88(2):169-175.
CN Notice of Allowance in Chinese Appln. No. 201980075215.0, mailed on Jan. 20, 2025, 7 pages (with English translation).
CN Office Action in Chinese Appln. No. 201980075215.0, mailed on Sep. 13, 2024, 8 pages (with English translation).

* cited by examiner

SEQUENCE LISTING

```
<160> NUMBER OF SEQ ID NOS: 22

<210> SEQ ID NO 1
<211> LENGTH: 20
<212> TYPE: RNA
<213> ORGANISM: Artificial
<220> FEATURE:
<223> OTHER INFORMATION: Synthetic RNA

<400> SEQUENCE: 1
gagcuugguc uguagcgguu                                               20

<210> SEQ ID NO 2
<211> LENGTH: 20
<212> TYPE: DNA
<213> ORGANISM: Artificial
<220> FEATURE:
<223> OTHER INFORMATION: Synthetic DNA

<400> SEQUENCE: 2
aaccgctaca gaccaagctc                                               20

<210> SEQ ID NO 3
<211> LENGTH: 20
<212> TYPE: RNA
<213> ORGANISM: Artificial
<220> FEATURE:
<223> OTHER INFORMATION: Synthetic RNA

<400> SEQUENCE: 3
cacugccuuc caccaaacuc                                               20

<210> SEQ ID NO 4
<211> LENGTH: 20
<212> TYPE: RNA
<213> ORGANISM: Artificial
<220> FEATURE:
<223> OTHER INFORMATION: Synthetic RNA

<400> SEQUENCE: 4
gagcuugguc uguagcgguu                                               20

<210> SEQ ID NO 5
<211> LENGTH: 19
<212> TYPE: DNA
<213> ORGANISM: Artificial
<220> FEATURE:
<223> OTHER INFORMATION: Synthetic RNA

<400> SEQUENCE: 5
uaccgcuguu accaauuuu                                                19
```

```
<210> SEQ ID NO 6
<211> LENGTH: 20
<212> TYPE: RNA
<213> ORGANISM: Artificial
<220> FEATURE:
<223> OTHER INFORMATION: Synthetic RNA

<400> SEQUENCE: 6
gagcuugguc uguagcgguu                                                    20

<210> SEQ ID NO 7
<211> LENGTH: 22
<212> TYPE: RNA
<213> ORGANISM: Artificial
<220> FEATURE:
<223> OTHER INFORMATION: Synthetic RNA

<400> SEQUENCE: 7
cacuguucaa gccuccaagc ug                                                 22

<210> SEQ ID NO 8
<211> LENGTH: 20
<212> TYPE: RNA
<213> ORGANISM: Artificial
<220> FEATURE:
<223> OTHER INFORMATION: Synthetic RNA

<400> SEQUENCE: 8
gagcuugguc uguagcgguu                                                    20

<210> SEQ ID NO 9
<211> LENGTH: 23
<212> TYPE: RNA
<213> ORGANISM: Artificial
<220> FEATURE:
<223> OTHER INFORMATION: Synthetic RNA

<400> SEQUENCE: 9
uggaugaugu gguauugggg gcc                                                23

<210> SEQ ID NO 10
<211> LENGTH: 22
<212> TYPE: RNA
<213> ORGANISM: Artificial
<220> FEATURE:
<223> OTHER INFORMATION: Synthetic RNA

<400> SEQUENCE: 10
agccccugcc caccgcacac ug                                                 22

<210> SEQ ID NO 11
<211> LENGTH: 21
<212> TYPE: RNA
<213> ORGANISM: Artificial
<220> FEATURE:
<223> OTHER INFORMATION: Synthetic RNA

<400> SEQUENCE: 11
acuccaccau agaucacucc c                                                  21

<210> SEQ ID NO 12
<211> LENGTH: 22
<212> TYPE: RNA
<213> ORGANISM: Artificial
<220> FEATURE:
<223> OTHER INFORMATION: Synthetic RNA
```

<400> SEQUENCE: 12
uggaguguga caauguguuu ug                                      22

<210> SEQ ID NO 13
<211> LENGTH: 61
<212> TYPE: DNA
<213> ORGANISM: Artificial
<220> FEATURE:
<223> OTHER INFORMATION: Synthetic DNA

<400> SEQUENCE: 13
tgtacatgtc ccactgttca agcctccaag ctgtgccttg ggtggctttg gggcatggac    60
a                                                                   61

<210> SEQ ID NO 14
<211> LENGTH: 61
<212> TYPE: DNA
<213> ORGANISM: Artificial
<220> FEATURE:
<223> OTHER INFORMATION: Synthetic DNA

<400> SEQUENCE: 14
tgtacatgtc ccacttttca agcctccaag ctgtgccttg ggtggctttg gggcatggac    60
a                                                                   61

<210> SEQ ID NO 15
<211> LENGTH: 61
<212> TYPE: DNA
<213> ORGANISM: Artificial
<220> FEATURE:
<223> OTHER INFORMATION: Synthetic DNA

<400> SEQUENCE: 15
tgttcatgtc ctactgttca agcctccaag ctgtgccttg ggtggctttg gggcatggac    60
a                                                                   61

<210> SEQ ID NO 16
<211> LENGTH: 61
<212> TYPE: DNA
<213> ORGANISM: Artificial
<220> FEATURE:
<223> OTHER INFORMATION: Synthetic DNA

<400> SEQUENCE: 16
tgttcatgtc ctactgttca agcctccaag ctgtgccttg ggtggcttta gggcatggac    60
a                                                                   61

<210> SEQ ID NO 17
<211> LENGTH: 61
<212> TYPE: DNA
<213> ORGANISM: Artificial
<220> FEATURE:
<223> OTHER INFORMATION: Synthetic DNA

<400> SEQUENCE: 17
tgttcatgtc ctactgttca agcctccaag ctgtgccttg ggtggctttg gggcatggac    60
a                                                                   61

<210> SEQ ID NO 18
<211> LENGTH: 61
<212> TYPE: DNA
<213> ORGANISM: Artificial

```
<220> FEATURE:
<223> OTHER INFORMATION: Synthetic DNA

<400> SEQUENCE: 18
tgttcatgtc ctactgttca agcctccaag ctgtgccttg ggtggctttg gggcatggac    60
a                                                                   61

<210> SEQ ID NO 19
<211> LENGTH: 61
<212> TYPE: DNA
<213> ORGANISM: Artificial
<220> FEATURE:
<223> OTHER INFORMATION: Synthetic DNA

<400> SEQUENCE: 19
tgttcatgtc ctactgttca agcctccaag ctgtgccttg ggtggctttg ggcatggac     60 a                                                                   61

<210> SEQ ID NO 20
<211> LENGTH: 61
<212> TYPE: DNA
<213> ORGANISM: Artificial
<220> FEATURE:
<223> OTHER INFORMATION: Synthetic DNA

<400> SEQUENCE: 20
tgttcatgtc ctactgttca agcctccaag ctgtgccttg ggtggctttg gggcatggac    60
a                                                                   61

<210> SEQ ID NO 21
<211> LENGTH: 61
<212> TYPE: DNA
<213> ORGANISM: Artificial
<220> FEATURE:
<223> OTHER INFORMATION: Synthetic DNA

<400> SEQUENCE: 21
tgttcatgtc ctactgttca agcctccaag ctgtgccttg ggtggctttg gggcatggac    60
a                                                                   61

<210> SEQ ID NO 22
<211> LENGTH: 61
<212> TYPE: DNA
<213> ORGANISM: Artificial
<220> FEATURE:
<223> OTHER INFORMATION: Synthetic DNA

<400> SEQUENCE: 22
tgttcatgtc ctactgttca agcctccaag ctgtgccttg ggtggctttg gggcatggac    60
a                                                                   61
```

COMPOSITION FOR INHIBITING REPLICATION OF HEPATITIS B VIRUS

CLAIM OF PRIORITY

This application is a National Stage application under 35 U.S.C. § 371 of International Application No. PCT/JP2019/044748, having an International Filing Date of Nov. 14, 2019, which claims priority to Japanese Application No. JP 2018-215898, filed on Nov. 16, 2018. The disclosure of the prior application is considered part of the disclosure of this application, and is incorporated in its entirety into this application.

TECHNICAL FIELD

The present invention relates to a composition for inhibiting the replication of hepatitis B virus.

BACKGROUND ART

MicroRNA (miRNA) is non-coding short RNA of about 22 nucleotides and forms a complex with AGO protein to serve as a regulatory factor for gene expression primarily through degradation or translational repression of mRNA having a target sequence (FIG. 1). During the process of standard miRNA production, a primary transcript containing hairpin structures, i.e., primary miRNA (pri-miRNA) is synthesized by transcription, as shown in FIG. 1. In the nucleus, Drosha, a kind of RNase III, cleaves pri-miRNA at the basal part of each hairpin to thereby produce precursor miRNAs (pre-miRNAs). The thus produced pre-miRNAs are exported from the nucleus to the cytoplasm mainly by the action of Exportin-5, and are cleaved with another RNase III, Dicer, to produce double-stranded RNAs (miRNA duplexes) of 20 to 24 nucleotides. Each double-stranded RNA is incorporated into Ago protein, and only one of its RNA strands forms a stable complex with the Ago protein to form an RNA-induced silencing complex (RISC). This single-stranded mature miRNA finally serves as a guide for gene expression control, resulting in RNA degradation or translational repression.

miRNAs were initially isolated as factors required for the growth of nematodes, but turned out to be a ubiquitous mechanism in animals and plants including humans as a result of further analyses. Moreover, many reports have indicated that miRNAs also control the replication and pathogenicity of DNA and RNA viruses (Non-patent Document 1: Jopling C L et al., Science 309, 1577-1581, 2005; Non-patent Document 2: Pedersen I M et al., Nature 449, 919-922, 2007). Hepatitis B virus (HBV) is classified as a DNA virus with an envelope structure, but synthesizes genomic DNA from pregenomic RNA (pgRNA) by its own reverse transcriptase during replication. Genomic DNA within HBV particles is a circular imperfect duplex and, after infection into hepatic cells, is converted into covalently closed circular DNA (cccDNA) in the nucleus to establish persistent infection. HBV mRNAs and pgRNA are expressed from cccDNA. Proteins such as viral antigens are expressed from HBV mRNAs, while HBV pgRNA not only functions as mRNA, but also serves as a source for virus capsid formation and HBV DNA synthesis. It has already been reported that HBV-derived mRNAs are targeted by host miRNAs and their expression are suppressed (FIG. 2, Non-patent Document 3: Zhang G L et al., Antiviral Res. 2010 November; 88(2):169-75). However, there has been no knowledge of miRNAs which directly promote HBV replication.

PRIOR ART DOCUMENTS

Non-Patent Documents

Non-patent Document 1: Jopling C L et al., Science 309, 1577-1581, 2005;

Non-patent Document 2: Pedersen I M et al., Nature 449, 919-922, 2007

Non-patent Document 3: Zhang G L et al., Antiviral Res. 2010 November; 88(2):169-75

SUMMARY OF THE INVENTION

Problem to be Solved by the Invention

The object of the present invention is to provide a composition for inhibiting the replication of hepatitis B virus and a pharmaceutical composition for treating hepatitis B virus infection, each comprising a substance inhibiting the function of microRNA miR-4453.

As a result of extensive and intensive efforts made to solve the problem stated above, the inventors of the present invention have succeeded in inhibiting virus replication by inhibiting the function of microRNA miR-4453, and have completed the present invention.

Means to Solve the Problem

Namely, the present invention is as follows.

(1) A composition for inhibiting the replication of hepatitis B virus, which comprises an inhibitory substance against microRNA binding to the 5' epsilon signal sequence in the pregenomic RNA of hepatitis B virus.

(2) A pharmaceutical composition for treating hepatitis B virus infection, which comprises an inhibitory substance against microRNA binding to the 5' epsilon signal sequence in the pregenomic RNA of hepatitis B virus.

(3) The composition according to (1) or (2) above, wherein the microRNA comprises a nucleotide sequence complementary to at least 7 nucleotides of the conserved sequence in the 5' epsilon signal sequence.

(4) The composition according to (3) above, wherein the sequence of 7 nucleotides is represented by CCAAGCU in the case of pregenomic RNA.

(5) The composition according to (1) or (2) above, wherein the microRNA is miR-4453.

(6) The composition according to (5) above, wherein miR-4453 consists of the nucleotide sequence represented by GAGCUUGGUCUGUAGCGGUU (SEQ ID NO: 1).

(7) The composition according to (1) or (2) above, wherein the inhibitory substance is a nucleic acid including an antisense oligonucleotide, siRNA, shRNA or a locked nucleic acid, which inhibits the function of miR-4453.

(8) The composition according to (1) or (2) above, wherein the inhibitory substance is a nucleic acid including an antisense oligonucleotide, siRNA, shRNA or a locked nucleic acid, which targets the whole or a part of the nucleotide sequence represented by GAGCUUGGUCUGUAGCGGUU (SEQ ID NO: 1).

(9) The composition according to (1) or (2) above, wherein the inhibitory substance is a nucleic acid including an antisense oligonucleotide, siRNA, shRNA or a locked nucleic acid, which consists of the nucleotide sequence represented by AACCGCTACAGAC-CAAGCTC (SEQ ID NO: 2).

(10) A method for inhibiting the replication of hepatitis B virus, which comprises the step of contacting hepatitis B virus in vitro with the composition according to any one of (1) to (9) above.

(11) A pharmaceutical composition comprising the composition according to any one of (1) to (9) above.

(12) The pharmaceutical composition according to (11) above, which is for use in gene therapy.

The present invention also includes the following inventions.

(13) A method for treating hepatitis B virus infection, which comprises administering a patient with the composition according to any one of (1) to (9) above or with an inhibitory substance against microRNA binding to the 5' epsilon signal sequence in the pregenomic RNA of hepatitis B virus. The method intended here also includes a gene therapy method. Moreover, the patient is not limited to a patient infected with hepatitis B virus and also includes a patient suspected to be infected with hepatitis B virus.

(14) The use of the composition according to any one of (1) to (9) above for the manufacture of a therapeutic agent for hepatitis B virus infection, or the use of an inhibitory substance against microRNA binding to the 5' epsilon signal sequence in the pregenomic RNA of hepatitis B virus for the manufacture of a therapeutic agent for hepatitis B virus infection. The therapeutic agent intended here also includes a gene therapy agent.

(15) The use of the composition according to any one of (1) to (9) above for the treatment of hepatitis B virus infection, or the use of an inhibitory substance against microRNA binding to the 5' epsilon signal sequence in the pregenomic RNA of hepatitis B virus for the treatment of hepatitis B virus infection. The treatment intended here also includes gene therapy.

(16) The composition according to any one of (1) to (9) above for use in the treatment of hepatitis B virus infection, or an inhibitory substance against microRNA binding to the 5' epsilon signal sequence in the pregenomic RNA of hepatitis B virus for use in the treatment of hepatitis B virus infection. The treatment intended here also includes gene therapy.

It should be noted that as to the microRNA binding to the 5' epsilon signal sequence in the pregenomic RNA of hepatitis B virus or the inhibitory substance against this microRNA in the inventions according to (13) to (16) above, the same embodiments as intended in the inventions according to (3) to (9) above may be adopted.

Effects of the Invention

The present invention provides a composition comprising a substance inhibiting the function of microRNA miR-4453. The composition of the present invention is useful in the treatment of hepatitis B.

DESCRIPTION OF EMBODIMENTS

The present invention provides a composition for inhibiting the replication of hepatitis B virus (HBV), as well as a pharmaceutical composition and method for treating HBV infection. The present invention is based on the use of an inhibitory substance against microRNA (miRNA) annealing to the 5' epsilon signal sequence in the pregenomic RNA (pgRNA) of HBV, i.e., an inhibitory substance against miRNA activating protein production essential for HBV replication or miRNA increasing the stability of pgRNA. This inhibitory substance can be used to inhibit the replication of HBV to thereby treat or alleviate diseases caused by HBV infection.

1. Summary

MicroRNAs (miRNAs) have been widely known to control the replication and pathogenicity of DNA and RNA viruses. Hepatitis B virus (HBV) is classified as a DNA virus with an envelope structure, but synthesizes genomic DNA from pregenomic RNA (pgRNA) by its own reverse transcriptase during replication. Although several miRNAs have already been reported to suppress the replication of HBV, the inventors of the present invention have now identified miRNAs whose expression varies predominantly upon HBV infection, among which miRNA directly acting on HBV RNA to activate HBV replication has been found. Moreover, the inventors of the present invention have also found that this miRNA interacts with an epsilon sequence essential for capsid formation and DNA synthesis from pgRNA.

As to the finding that miRNAs positively act on viral RNAs, the case of miR-122 in hepatitis C virus (HCV) has been known (Jopling C L, Yi M, Lancaster A M, Lemon S M, Sarnow P. Science. 2005 Sep. 2; 30(5740):1577-81. Modulation of hepatitis C virus RNA abundance by a liver-specific MicroRNA), but this finding is a first for HBV. An inhibitor of this miRNA suppresses virus replication and is therefore available for use as a novel therapeutic agent for HBV infection.

Figure 1:
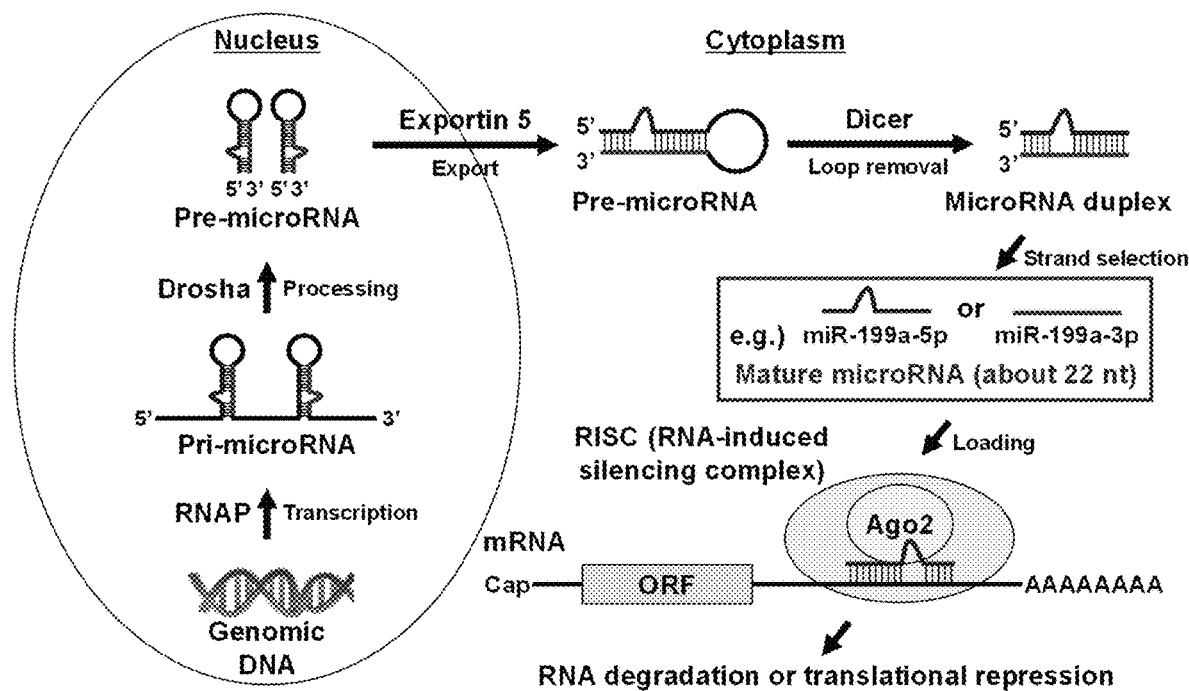
FIG. 1 shows the expression and function of microRNA (miRNA).
Figure 2:
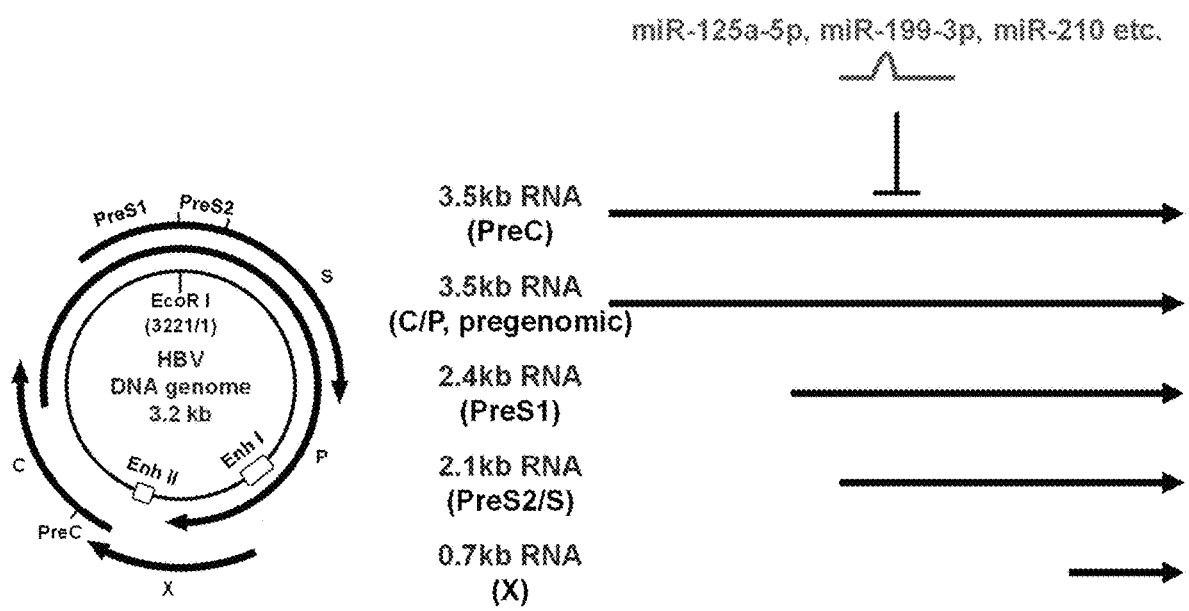
FIG. 2 shows the DNA genome of HBV along with RNA structures.
Figure 8:
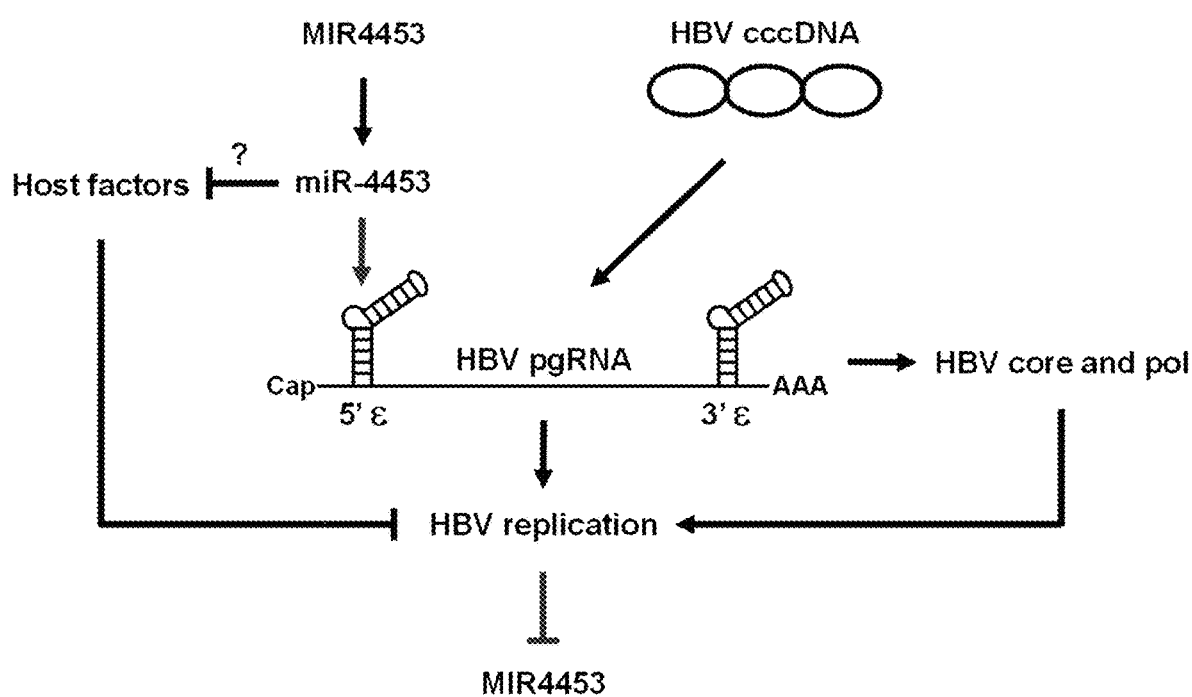
FIG. 8 shows a model for miR-4453-mediated regulation of HBV replication.

FIG. 2 shows the DNA genome of HBV along with RNA structures. The DNA genome of HBV is 3.2 kb, and five mRNAs are expressed therefrom, as shown in FIG. 2. Among them, 3.5 kb pregenomic RNA (pgRNA) functions as a template for HBV genomic DNA production. Several miRNAs have been reported to suppress HBV replication, but there has been found no miRNA which targets HBV RNA to thereby enhance HBV replication.

pgRNA has two epsilon signal sequences at the 5' and 3' sides (FIG. 8). In the present invention, it has been found that virus replication is inhibited upon inhibition of miRNA binding to the 5' epsilon signal sequence, particularly miRNA binding to a sequence of at least 7 nucleotides in the conserved sequence in the 5' epsilon signal sequence.

Thus, the present invention provides an inhibitory substance against microRNA binding to the 5' epsilon signal sequence in the pregenomic RNA of HBV. The expression "inhibitory substance against microRNA" is intended to mean a nucleic acid which forms base pairs with microRNA and thereby inhibit the function of the microRNA.

The inventors of the present invention have found that as an inhibitory substance against microRNA (e.g., an inhibitory substance inhibiting the function of miR-4453), for example, an antisense oligonucleotide, siRNA, shRNA, or a single-stranded oligonucleotide containing nucleotide analogs such as locked nucleic acid (LNA) units causes inhibition of the miRNA function. To cause inhibition of the miRNA function, an antisense oligonucleotide, siRNA, shRNA or an oligonucleotide containing LNA units may be used against miRNA binding to a seed region sequence, particularly the conserved region in the 5' epsilon signal sequence.

miRNA binding to a sequence of at least 7 nucleotides in the conserved sequence in the 5' epsilon signal sequence may be exemplified by miR-4453, while an inhibitory substance against miR-4453 may be exemplified by a nucleic acid (an antisense oligonucleotide, siRNA, shRNA or LNA) having a nucleotide sequence complementary to the whole or a part of the nucleotide sequence of miR-4453. Such an antisense oligonucleotide, siRNA, shRNA or LNA is also herein referred to as an "inhibitor."

The conserved sequence of 7 nucleotides in the 5' epsilon signal sequence in the above pregenomic RNA is represented by "CCAAGCU" and an inhibitory substance against miR-4453, which comprises such a conserved sequence, may be exemplified by an inhibitor against miR-4453 (e.g., represented by GAGCUUGGUCUGUAGCGGUU (SEQ ID NO: 1)).

In the present invention, the nucleotide sequence of an inhibitor (e.g., LNA) is a complementary sequence to the mature sequence of miR-4453, and its length is not limited in any way but is, for example, 16 to 27 nucleotides, preferably 20 nucleotides. For example, in the nucleotide sequence of LNA, at least one nucleotide may be a LNA monomer, or two or more nucleotides may be LNA monomers, and it is preferred in the present invention that 20 nucleotides are LNA monomers.

For example, the mature sequence of miR-4453, and the nucleotide sequence of an inhibitor containing LNA against the miR-4453 mature sequence are shown below.

1. The mature sequence of miR-4453: GAGCUUGGUCUGUAGCGGUU (SEQ ID NO: 1)
2. The sequence of LNA against the mature sequence of miR-4453: AACCGCTACAGACCAAGCTC (SEQ ID NO: 2)

The present invention relates to a composition for inhibiting HBV replication and a pharmaceutical composition for treating HBV infection, each comprising an inhibitory substance against microRNA binding to the 5' epsilon signal sequence in the pregenomic RNA of HBV. Diseases based on HBV infection include not only hepatitis B, but also HBV-associated diseases such as hepatic fibrosis, chronic hepatitis, cirrhosis, liver cancer, etc.

The mode of administration for the composition of the present invention may be injection, as exemplified by standard systemic administration via the intravenous or intraarterial route, as well as topical administration via the intramuscular, intraarticular, subcutaneous or intracutaneous route. Further, the mode of administration using a catheter may also be used. In this case, the composition of the present invention is generally provided in the form of a unit dose ampule or a multi-dose container, and may be in powder form which is reconstituted with an appropriate carrier, e.g., sterilized water at the time of use.

In addition to the injection mentioned above, the mode of administration for the composition of the present invention includes suppositories, administration through the nasal cavity or oral mucosa, oral administration, etc.

Moreover, the above dosage forms may contain additives commonly used in formulations. Such additives include excipients, fillers, extenders, binders, wetting agents, disintegrants, lubricants, surfactants, dispersants, buffering agents, preservatives, solubilizers, antiseptics, correctives, soothing agents, stabilizing agents and isotonizing agents, which are commonly used during drug preparation. These additives may be selected as appropriate for use in the preparation of the dosage forms in a standard manner.

The dose will vary depending on the purpose of treatment, the age of a subject to be administered, the route of administration and/or the frequency of administration, and may be changed within a wide range. The amount of the nucleic acid contained in the pharmaceutical composition of the present invention may be determined as appropriate by those skilled in the art.

Other methods for treatment include gene therapy using a gene therapy vector designed to express shRNA inhibiting the function of target miRNA.

A gene therapy vector may be obtained by inserting an inhibitory substance (DNA) such as the above shRNA sequence into an appropriate vector. Vectors used for insertion of an inhibitory substance are broadly divided into non-viral vectors and viral vectors. For example, non-viral vectors include vectors having pCAGGS, etc.

On the other hand, viral vectors include, for example, adenovirus, lentivirus and so on.

Kits for the use of viral vectors are commercially available (e.g., Adeno-X Adenoviral System 3 (Takara Bio Inc., Japan) and adeno-associated virus (AAV) vectors (Applied Viromics)), and a viral vector may be readily constructed.

In the present invention, a gene therapy vector is introduced into a patient with a HBV-associated disease by direct introduction into the patient's tissue, or alternatively, target cells are taken from such a patient and a gene therapy vector is introduced in vitro into these cells, which are then returned into the patient's body.

For example, the effective dose of the pharmaceutical composition of the present invention administered either alone or as a combination with an appropriate diluent and a pharmacologically acceptable carrier is in the range of 10 mg to 200 mg per kg body weight per administration, which is given at intervals of 1 week to 1 month.

The dose of a gene therapy virus may be adjusted as appropriate depending on, e.g., the stage, age and body weight of a patient. For example, the effective dose is $1\times10^{12}$ to $2\times10^{13}$ genome copies/kg. The gene therapy virus is administered at this dose once to several times.

EXAMPLES

The present invention will be further described in more detail by way of the following illustrative examples. However, the scope of the present invention is not limited by these examples.

Example 1

1. Methods

The inventors of the present invention used chimeric mice with humanized livers as an animal model of HBV infection. The HBV strains used as sources of infection were the Ae_JPN strain of genotype A (AB246338.1) and the C_JPNAT strain of genotype C (AB246345.1). After 10 weeks of infection, RNAs were prepared from the mouse livers and subjected to RNA-seq analysis. As primary human hepatocytes, PXB cells (PhoenixBio) were used. The miRNAs used were miRIDIAN microRNA mimics (Dharmacon), and the miRNA inhibitors used were miRCURY LNA microRNA Power Inhibitors (YI04104482) (Exiqon). For miRNA delivery to the primary human hepatocytes, a multifunctional envelope-type nanodevice (MEND) was used (Yamamoto N, Sato Y, Munakata T, Kakuni M, Tateno C, Sanada T, Hirata Y, Murakami S, Tanaka Y, Chayama K, Hatakeyama H, Hyodo M, Harashima H, Kohara M. J Hepatol. 2016 March; 64(3):547-55. Novel pH-sensitive multifunctional envelope-type nanodevice for siRNA-based treatments for chronic HBV infection). For HBV replication analysis in cultured cells, HepG2.2.15-derived cells constitutively expressing HBV were used. Moreover, HepG2-hNTCP-C4 and HepG2-hNTCP-30 cells overexpressing hNTCP, which seems to be a HBV receptor, were used in infection experiments. In pgRNA analysis, the core protein of HBV was replaced with secretory luciferase, whereby a reporter not causing co-expression of HBpol was used.

2. Results

Figure 3:
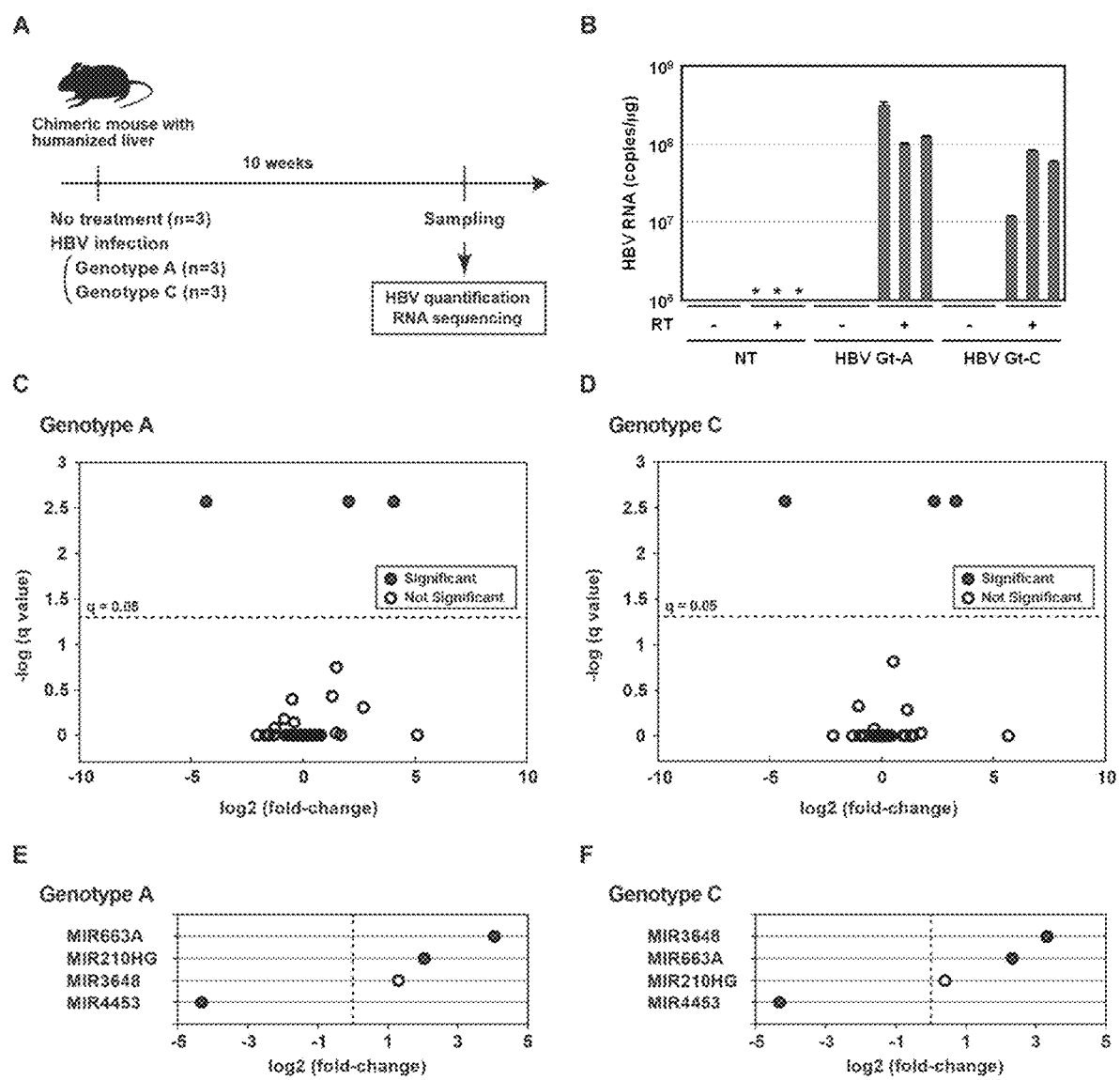
FIG. 3 shows changes in miRNA expression levels after HBV infection in vivo.

As miRNAs whose expression significantly varied upon HBV infection into the chimeric mice, three miRNAs (MIR663A (up), MIR210HG (up), MIR4453 (down)) were identified in genotype A, while three miRNAs (MIR3648 (up), MIR663A (up), MIR4453 (down)) were identified in genotype C (FIG. 3). Among these miRNAs, MIR210HG has already been reported as miRNA whose expression is increased in a manner dependent on HBV replication and which targets HBV mRNA to suppress protein expression.

FIG. 3 shows changes in miRNA expression levels after in vivo HBV infection. Panels A to F are as follows.
(A) Experimental schedule of HBV infection in chimeric mice with humanized livers.
(B) Quantification of HBV RNA in chimeric mice infected with HBV. (C and D) Volcano plots each showing miRNA expression quantified by RNA-seq analysis. The X-axis represents the log value of change in expression, while the Y-axis represents the negative log value of q value. Significant miRNAs (q<0.05) are plotted in red. The value of fold change was scored as HBV genotype A/non-infected (C) or as HBV genotype C/non-infected (D). (E and F) Log 2 (fold change) plots of miRNAs showing significant (q<0.05) change.

Figure 4:
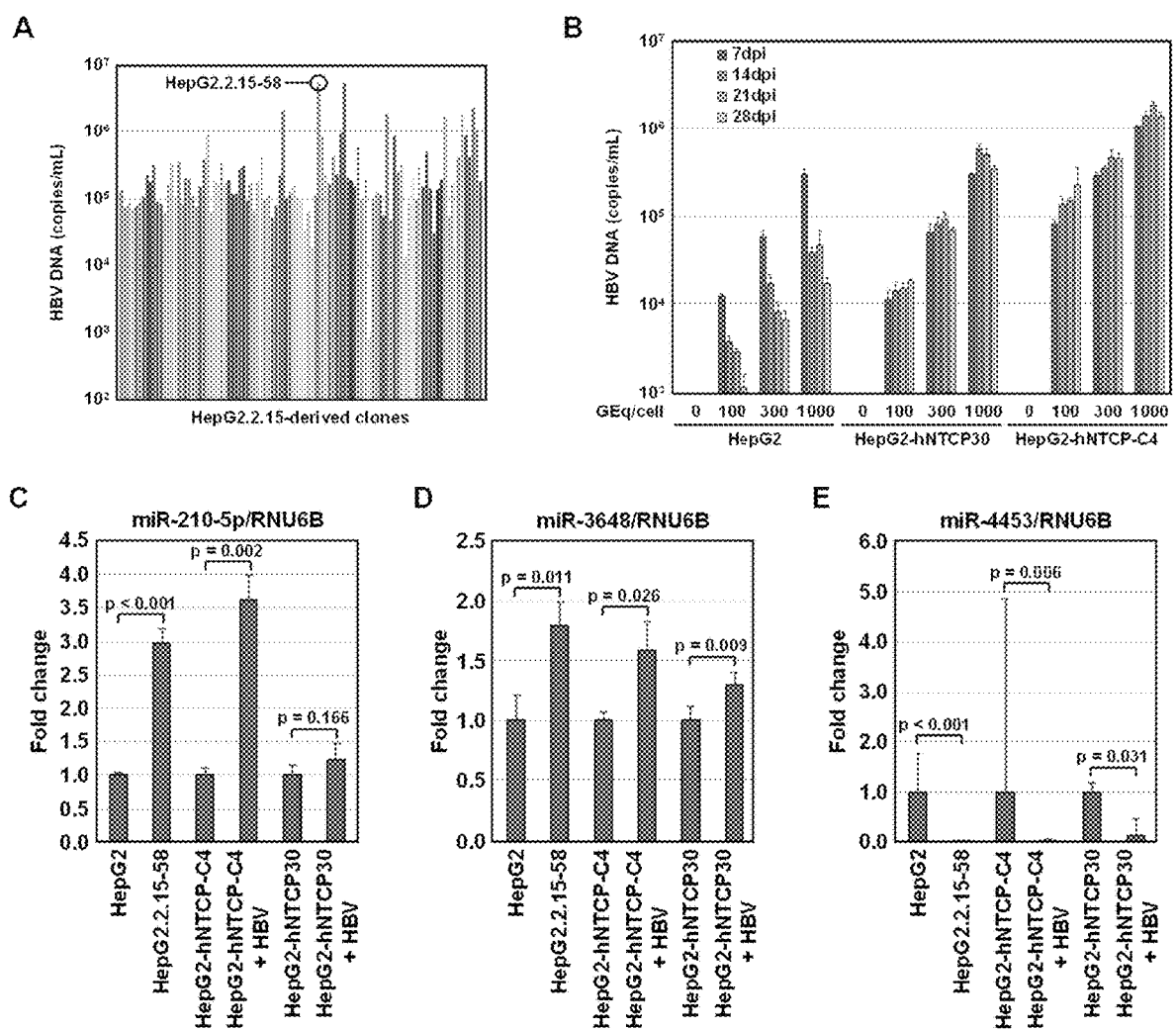
FIG. 4 shows miRNA expression profiles in HBV replication and infection in vitro.

Secondly, from the cultured cell system for HBV replication and infection, the inventors of the present invention found that HBV-induced changes in the expression of miR-210-5p, miR-3648 and miR-4453 were the same as those in the animal model (FIG. 4).

FIG. 4 shows miRNA expression profiles in HBV replication and infection in vitro. In FIG. 4, panels A to F are as follows.
(A) Cloning of HepG2.2.15-58 by limiting dilution. HBV DNA titers were shown for the respective cell lines cloned from HepG2.2.15. The position of HepG2.2.15-58 was indicated with a circle. (B) HBV infection in HepG2-derived cells ectopically expressing human NTCP. HepG2-hNTCP-C4 and HepG2-hNTCP-30 were infected with HBV at the GEq/cell ratios indicated, and HBV DNA titers in the media collected every 7 days were quantified. Normal HepG2 cells were used as a negative control. (C, D and E) The expression levels of miR-210-5p, miR-3648 and miR-4453 were compared between HepG2 and HepG2.2.15-58 cells, between naive and HBV-infected HepG2-hNTCP-C4 cells, or between naive and HBV-infected HepG2-hNTCP-30 cells. The cells were inoculated with HBV at the genome equivalent (GEq)/cell ratio indicated.

Figure 5:
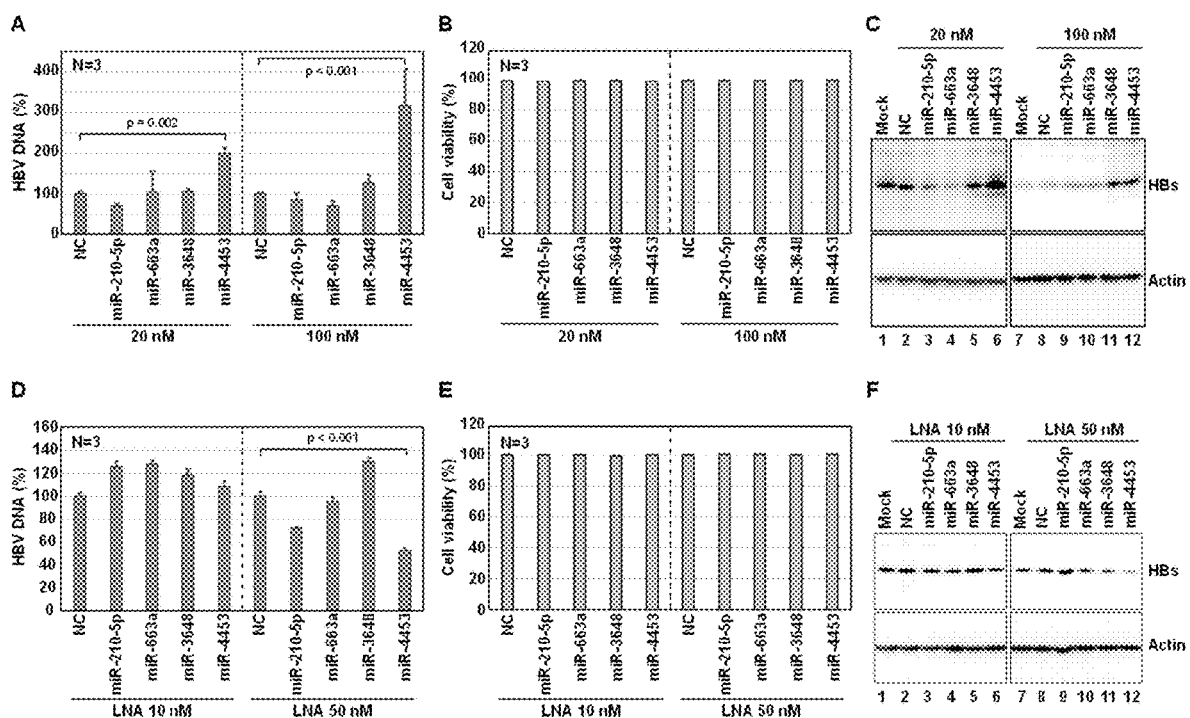
FIG. 5 shows the effects of selected miRNAs on HBV in an in vitro model of HBV replication.

Further, as a result of examining the effects of the above miRNAs on HBV replication in HepG2.2.15-derived cells, miR-4453 was found to have the function of increasing the amounts of HBV DNA and HBs protein (FIG. 5).

FIG. 5 shows the effects of selected miRNAs on HBV in the in vitro model of HBV replication. In FIG. 5, panels A to F are as follows.
(A to C) Gain-of-function analysis of miRNAs upon transfection of exogenous miRNAs into HepG2.2.15-58 cells. After miRNA transfection, the amount of HBV DNA in the medium was quantified (A), and cell viability was measured in each transfection (B). HBs and actin (loading control) were also immunoblotted (C). (D to F) Loss-of-function analysis of miRNAs upon transfection of LNA inhibitors of miRNAs into HepG2.2.15-58 cells. After LNA inhibitor transfection, the amount of HBV DNA (D), cell viability (E) and the amount of HBs (F) were observed.

In analysis using an inhibitor of miR-4453, the amounts of HBV DNA and HBs protein were reduced conversely. Also in the experiment of HBV infection into PXB cells, miR-4453 was found to increase virus replication and the miR-4453 inhibitor was found to suppress virus replication. Thus, the target of miR-4453 is deemed to be a factor which plays an important role in HBV replication.

Figure 6:
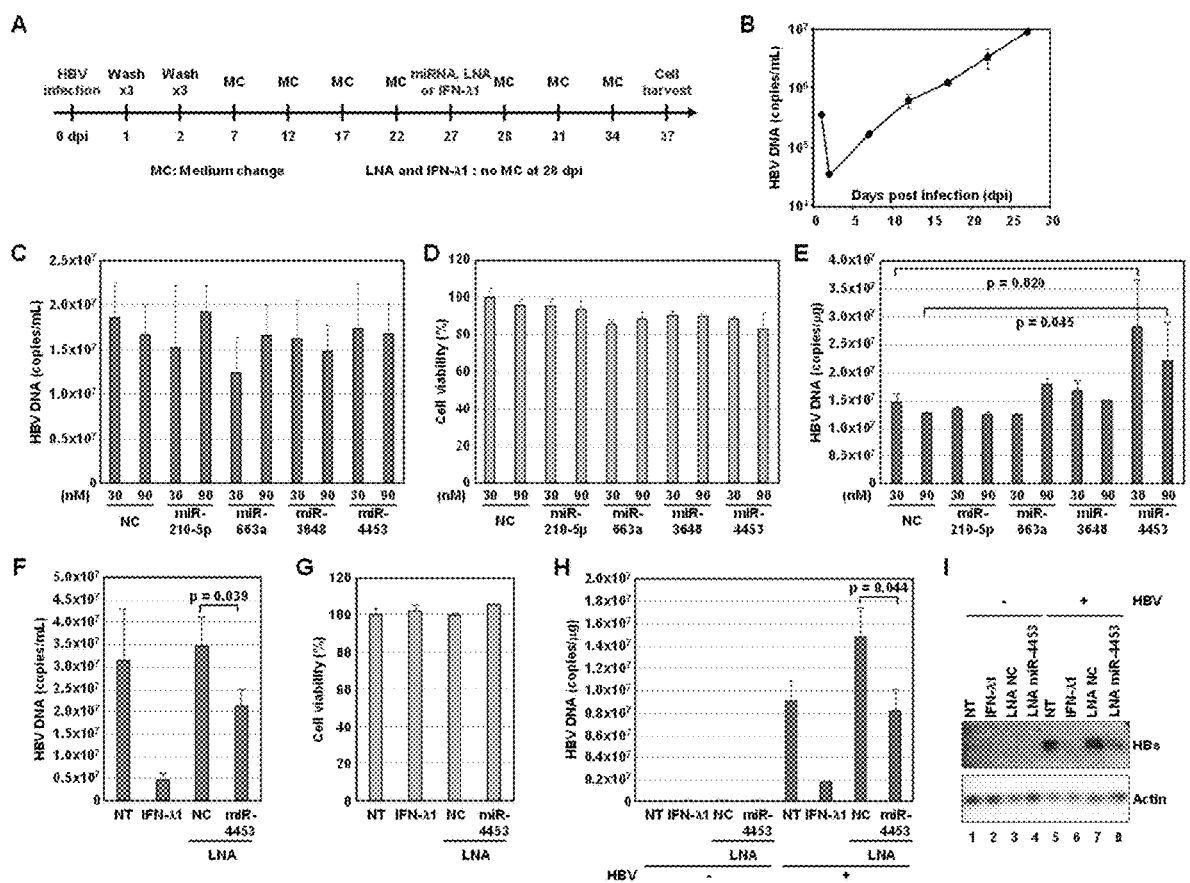
FIG. 6 shows the effects of selected miRNAs on HBV in primary human hepatocytes infected with HBV.

FIG. 6 shows the effects of selected miRNAs on HBV in primary human hepatocytes infected with HBV. In FIG. 6, panels A to I are as follows.
(A) Schematic diagram showing HBV infection into human primary hepatocytes (PHH).
(B) The amount of HBV DNA in the medium after infection. (C to E) Gain-of-function analysis of miRNAs upon transfection of exogenous miRNAs into PHH. At 10 days after transfection, the amount of HBV DNA in the medium (C) or in the cells
(E) was quantified, and cell viability was measured in each transfection (D). (F to I) Loss-of-function analysis of miRNAs upon transfection of LNA inhibitors of miRNAs into primary human hepatocytes (PHH). After 100 nM inhibitor transfection, the amount of HBV DNA in the culture medium was quantified (F), and cell viability was measured in each transfection (G). As a positive control of HBV replication inhibitor, IFN-λ1 was added at 100 ng/mL. The amount of HBV DNA was also measured in non-infected and HBV-infected PHH (H), and HBs and actin (loading control) were immunoblotted under the same conditions (I).

To study the target of miR-4453 (FIG. 6), the same mechanism as for the effect of miR-122 on HCV was first examined in terms of improved virus replication to search for target sequence candidates in HBV-derived RNA.

Figure 7:
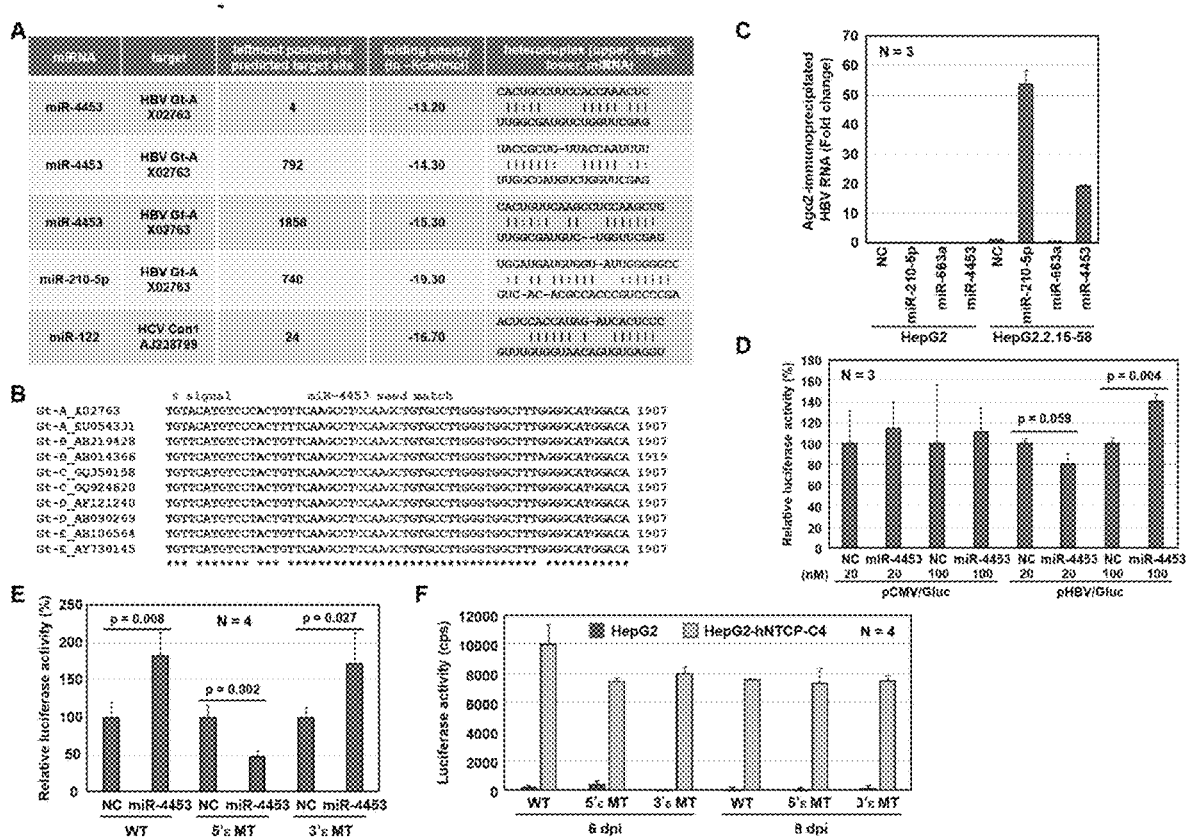
FIG. 7 shows candidate targets of miR-4453 in HBV RNA.

The results obtained are shown in FIG. 7. FIG. 7 shows candidate targets of miR-4453 in HBV RNA. Panels A to F are as follows.

(A) Predicted miR-4453 binding sites in HBV RNA. To identify miR-4453 binding sites, a RNA22v2 microRNA target detection program was used. miR-210-5p has been reported to interact with HBV RNA. miR-122 and HCV RNA were used for validation of the program. It should be noted that the nucleotide sequences of target RNAs and miRNAs shown in panel A are set forth in SEQ ID NOs: 3 to 12. (B) Alignment of HBV epsilon (s) regions from five different genotypes. The miR-4453 seed match sequence was shown in red. The EcoR1 restriction site of X02763 (HBV genotype A) was used as +1 for numbering the HBV genome. It should be noted that the nucleotide sequences of the epsilon regions shown in panel B are set forth in SEQ ID NOs: 13 to 22. (C) Interaction between miR-4453 and HBV RNA. RNA immunoprecipitation assay was performed with anti-Ago2 mAb on extracts from the miRNA-transfected cells indicated, and co-precipitated HBV RNAs were quantified by qRT-PCR.

(D) miR-4453-induced enhancement of HBV pgRNA reporter activity. An HBV pgRNA reporter, pHBV/Gluc, was transfected into HepG2 cells in the presence and absence of miR-4453, and the activity of secreted luciferase was measured. As a negative control, pCMV/Gluc (Gluc expression is driven by a cytomegalovirus (CMV) promoter) was used. (E) Effects of miR-4453 binding site mutations in $ regions on the pgRNA reporter. 5'ε MT and 3'ε MT represent point mutations in the 5'UTR and 3'UTR ε regions, respectively. The miR-4453 binding site in 5'ε is required for enhancement of the pgRNA reporter. (F) Effects of miR-4453 binding site mutations in epsilon regions on HBV capsid formation. The infectious titer of the HBV reporter is measured by the activity of secreted luciferase. There was no difference between 5'ε and 3'ε mutations.

The results of FIG. 7 indicated that a miR-4453 target candidate sequence allowing theoretically most stable binding was present in the epsilon signals conserved in all genotypes and essential for HBV capsid formation and DNA synthesis (FIG. 7A, 7B). Then, RNA immunoprecipitation analysis with an antibody against Ago2 was performed, thus indicating that HBV RNAs and miR-4453 interacted with each other (FIG. 7C).

Moreover, for study of how miR-4453 would activate virus replication, the inventors of the present invention performed pgRNA reporter analysis, and miR-4453 was found to increase luciferase activity independently of HBpol (FIG. 7D). Since this reporter contains two epsilon signals, mutations were introduced into miR-4453 target candidate sequences in these two epsilon signals and pgRNA reporter analysis was also repeated, thus indicating that the miR-4453-dependent increase in luciferase activity disappeared in a mutant of the 5' epsilon sequence (FIG. 7E). It was therefore suggested that miR-4453 would bind to the 5' epsilon signal in HBV pgRNA to thereby activate HBV translation or increase pgRNA stability. The miR-4453 binding sequence mutants in the epsilon signals were found not to affect the formation of virus particles (FIG. 7F). Namely, the higher order structure of each epsilon would not be greatly changed even when a mutation is introduced.

3. Discussion

As to the finding that miRNAs positively act on viral RNAs, the case of HCV and miR-122 has been known, but this finding is a first for HBV (FIG. 8).

FIG. 8 shows a model for miR-4453-mediated regulation of HBV replication.

HBV pgRNA has two epsilon signals, and the epsilon located in the 5'UTR is targeted by miR-4453, which in turn enhances HBV replication by activated translation from pgRNA or stabilization of pgRNA. HBV replication causes the down-regulation of miR-4453 expression and shows a negative feedback loop. However, HBV replication is still maintained by a low level of miR-4453.

An inhibitor of miR-4453 suppresses virus replication and is therefore expected to lead to the development of a new therapy for HBV infection, as in the case of miravirsen (miR-122 inhibitor, serving as a therapeutic agent for HCV infection) (Lanford R E, Hildebrandt-Eriksen E S, Petri A, Persson R, Lindow M, Munk M E, Kauppinen S, Ørum H. Science. 2010 Jan. 8; 327(5962):198-201. Therapeutic silencing of microRNA-122 in primates with chronic hepatitis C virus infection). In the case of miR-122, there have been proposed a mechanism acting on HCV RNA stability and a mechanism contributing to translation from HCV RNA. According to functional analysis, miR-4453 may also have these two mechanisms.

Example 2

About Mechanisms

Figure 9:
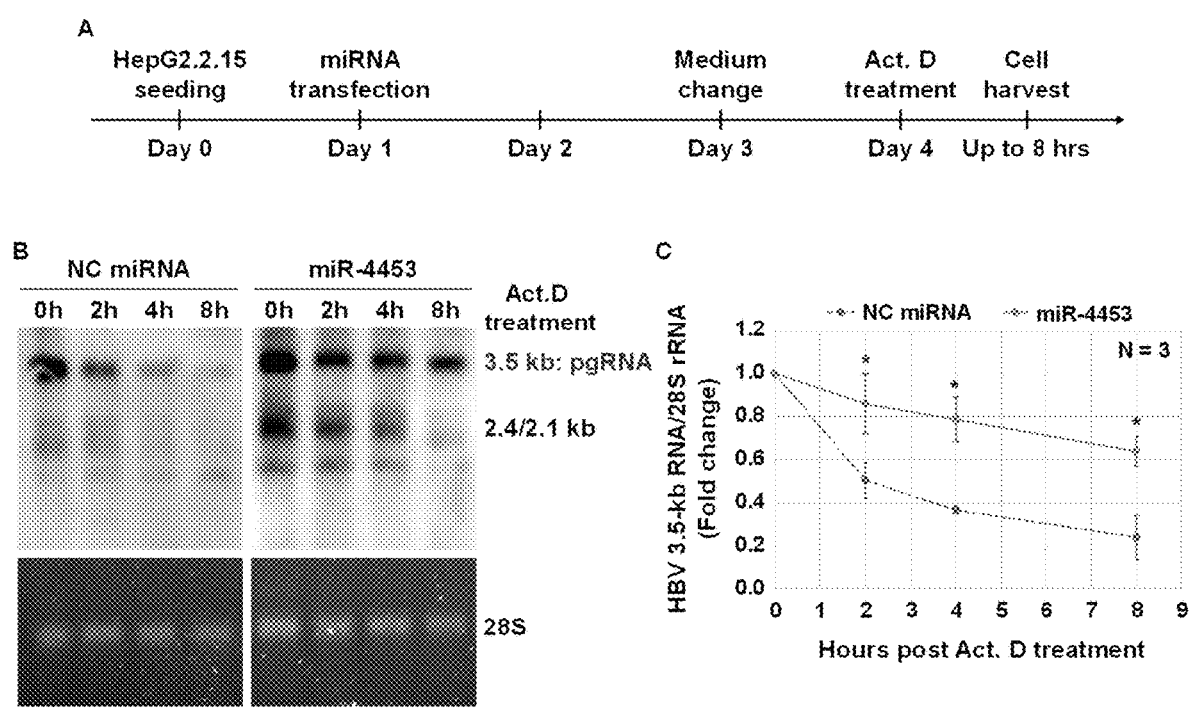
FIG. 9 shows the results obtained when pgRNA stability was analyzed by Northern blotting techniques in a condition where new RNA synthesis was arrested with actinomycin D.

Since miR-4453 was found to target the 5' epsilon in pgRNA, the inventors of the present invention analyzed the behavior of 3.5 kb pgRNA by Northern blotting. As a result, it was found that in HepG2.2.15 cells where HBV constitutively replicates, the amount of pgRNA was increased upon addition of miR-4453 while the amount of pgRNA was reduced upon addition of an inhibitor of miR-4453. In addition, the inventors of the present invention analyzed pgRNA stability by Northern blotting in a condition where new RNA synthesis was arrested by addition of actinomycin D to the culture system. As a result, it was found that pgRNA stability was increased in a manner dependent on miR-4453 (FIG. 9).

About the Effects of Different miR-4453 Inhibitors

Figure 10:
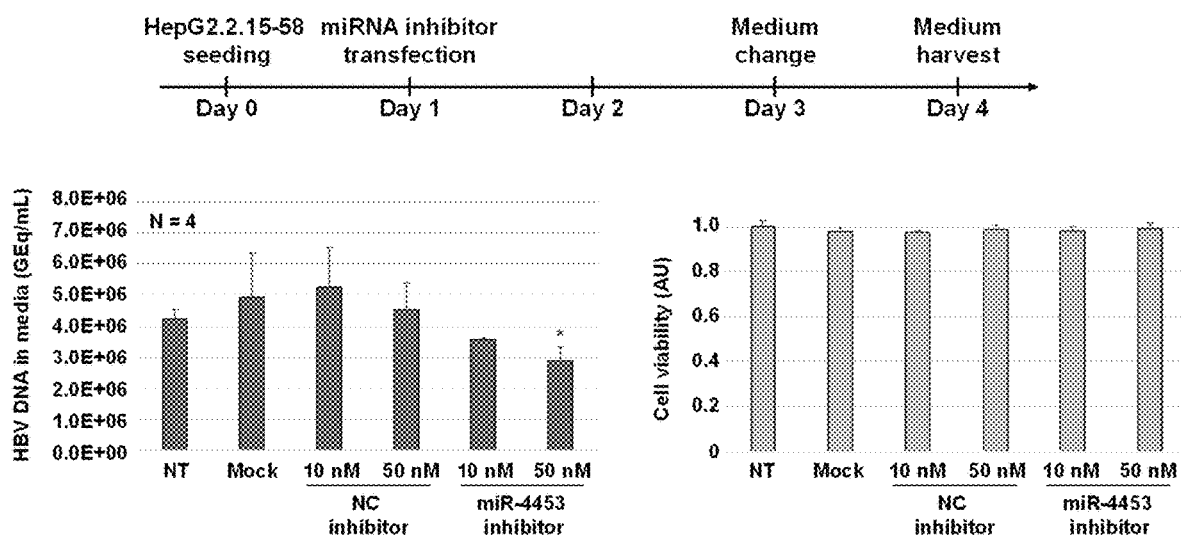
FIG. 10 shows the test results of HBV replication suppression with a mir-4453 inhibitor, miRIDIAN.
Figure 11:
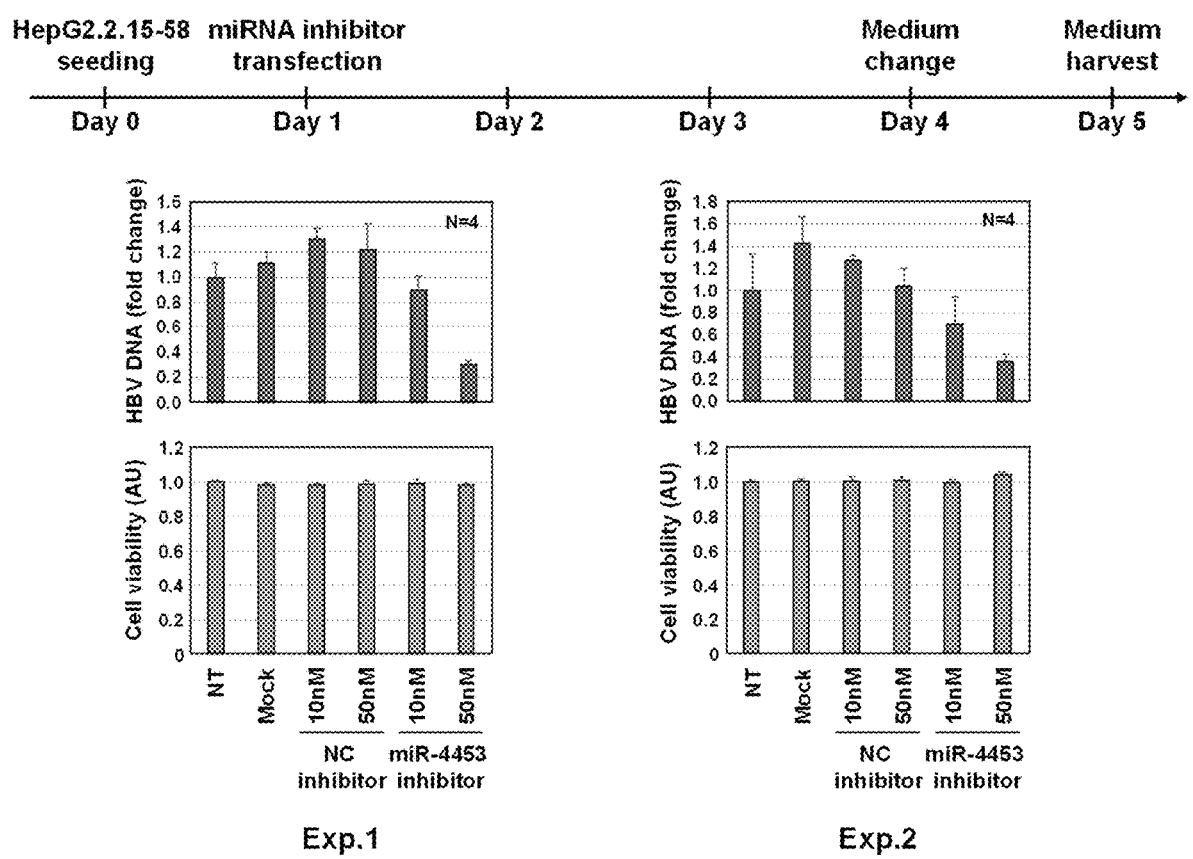
FIG. 11 shows the test results of HBV replication suppression with a mir-4453 inhibitor, S-TuD.
Figure 12:
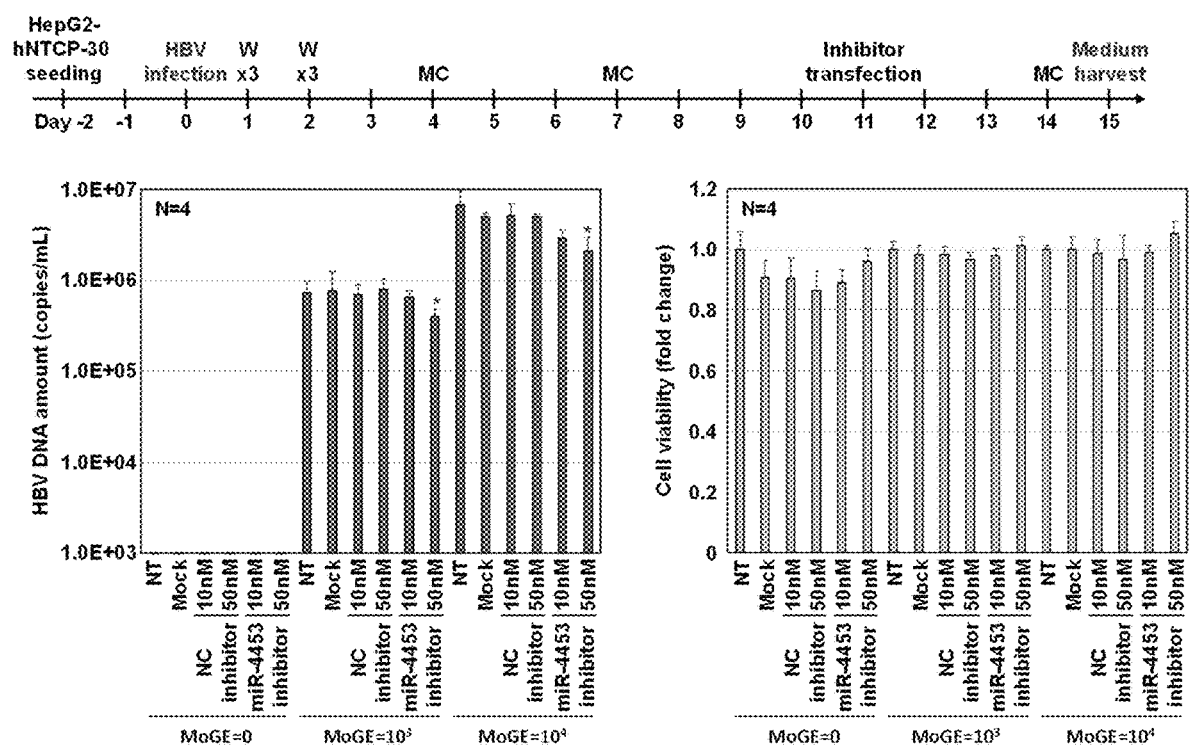
FIG. 12 shows the test results of HBV replication suppression with a mir-4453 inhibitor, S-TuD.

In the previous analyses with a miR-4453 inhibitor, the inhibitor available from Exiqon was used to study the effect on HBV. With the aim of eliminating the possibility that the inhibitory effect on miR-4453 is specific for the Exiqon's product, the inventors of the present invention performed the same inhibition experiment using distinct types of miR-4453 inhibitors. First, a miRIDIAN microRNA Hairpin Inhibitor available from Dharmacon was used for analysis in HepG2.2.15 cells, and this miR-4453 inhibitor was found to suppress HBV replication in a concentration-dependent manner, as in the case of the previous analyses (FIG. 10). Further, another miRNA inhibitor S-TuD commercially available from SIGMA was used to repeat the same experiment, and the concentration-dependent suppression of HBV replication was observed in HepG2.2.15 cells (FIG. 11). The miR-4453 inhibitor S-TuD was also found to suppress HBV replication in an infection experiment using HepG2-hNTCP-30 cells. Moreover, this inhibitor was found not to affect cell viability (FIG. 12). These results indicated that three distinct types of miR-4453 inhibitors suppressed HBV replication.

Figure 13:
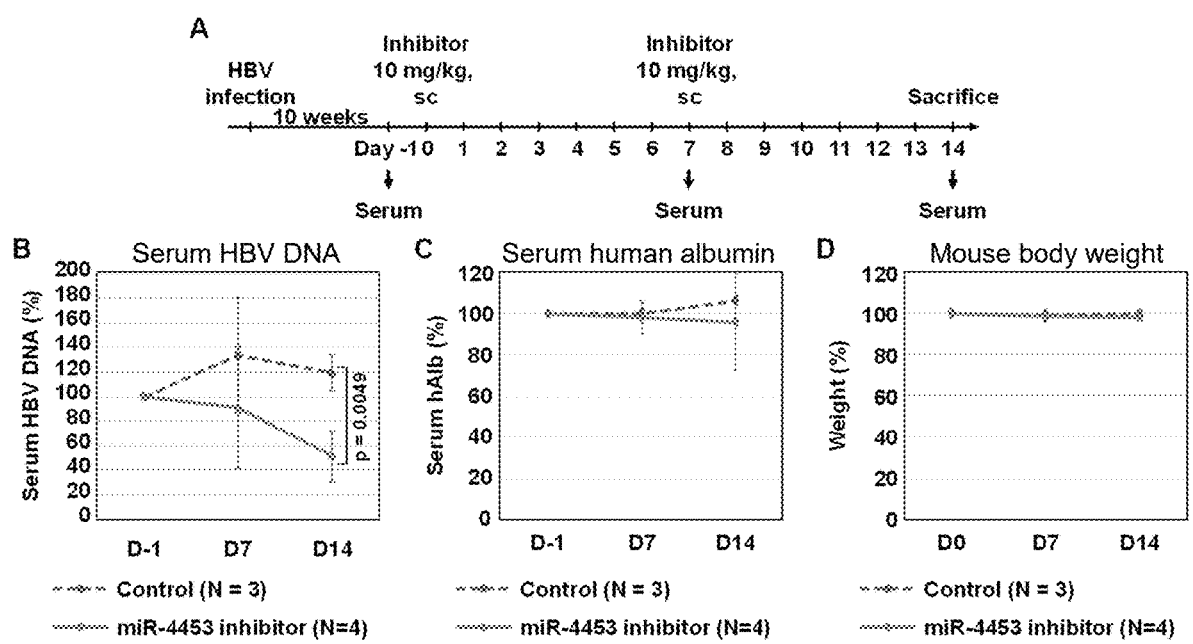
FIG. 13 shows the results obtained when a mir-4453 inhibitor was analyzed for its anti-HBV effect in chimeric mice with humanized livers.

About Analysis of the Effect of a miR-4453 Inhibitor in an Animal Model of HBV Infection Using chimeric mice with humanized livers, an experiment was performed to examine whether a miR-4453 inhibitor had an anti-HBV effect during persistent infection of HBV. Chimeric mice in which persistent infection was established after 10 weeks had passed since HBV infection were administered with the inhibitor (Exiqon) and measured over time for the amount of HBV DNA in their sera. As a result, comparison between the control group and the miR-4453 inhibitor-receiving group at 14 days after administration indicated that the amount of HBV DNA was significantly reduced by the action of the miR-4453 inhibitor. On the other hand, both groups showed no change in human serum albumin level or body weight (FIG. 13). Thus, the miR-4453 inhibitor was shown to have an anti-HBV effect not only in the cultured cell system but also in the animal model of HBV infection.

SEQUENCE LISTING FREE TEXT

SEQ ID NOs: 1 and 3 to 12: synthetic RNAs
SEQ ID NOs: 2 and 13 to 22: synthetic DNAs

The invention claimed is:

1. A method for inhibiting the replication of hepatitis B virus, which comprises the step of contacting hepatitis B virus in vitro with a composition comprising:
    i) an antisense oligonucleotide that consists of the nucleotide sequence AACCGCTACAGACCAAGCTC (SEQ ID NO: 2) or an RNA sequence that corresponds to the nucleotide sequence of SEQ ID NO:2, wherein "T" (thymine) is changed to "U" (uracil), or
    ii) the antisense oligonucleotide of the above i), which comprises a locked nucleic acid.

* * * * *